Feb. 2, 1960 C. P. HANKUS Re. 24,774

PACKAGING DEVICE

Original Filed Dec. 28, 1956

INVENTOR.
Chester P. Hankus
BY
Kenneth D. Snow
Atty.

United States Patent Office

Re. 24,774
Reissued Feb. 2, 1960

24,774

PACKAGING DEVICE

Chester P. Hankus, Chicago, Ill., assignor, by mesne assignments, of sixty-five percent to Chester P. Hankus, Calumet Park, Ill., ten percent to Peter Van Beek, Chicago, Ill., ten percent to Theodore Hankus, Calumet Park, Ill., and fifteen percent to Kenneth T. Snow, Wheaton, Ill.

Original No. 2,887,220, dated May 19, 1959, Serial No. 631,110, December 28, 1956. Application for reissue June 29, 1959, Serial No. 823,792

3 Claims. (Cl. 206—65)

Matter enclosed in heavy brackets [ ] appears in the original patent but forms no part of this reissue specification; matter printed in italics indicates the additions made by reissue.

This invention relates to a new and improved packaging device.

Packaging devices are notoriously old yet with the advent of new articles many of which are delicate and fragile new storage problems are always arising. It is with one of these storage problems that the present invention is concerned.

A principal object of the present invention is to provide a storing carton for the fragile, delicate branches of an artificial Christmas tree.

An important object of this invention is the provision of means in a storage carton for holding relatively fragile members in spaced apart relationship and in a removable tray which is held in fixed position on the bottom of the carton when the carton is closed.

Another important object of this invention is to equip a tray or the like of corrugated board laminate with a plurality of holes therein to receive generally elongated fragile objects and maintain them in spaced apart position from each other and generally firmly affixed to the tray and held against undesirable separation therefrom.

Still another and further important object of this invention is to supply a corrugated laminate with triangular shaped holes punched therethrough to receive generally round rods and grip the round rods with sufficient force to prevent removal by jarring or tilting of the corrugated laminate and to hold the round rods in the triangular holes until manually removed.

Another and still further important object of this invention is to provide a storing carton with a removable tray therefor and the tray having a plurality of holding means and having further means on the carton doors for cooperating with the tray when the carton is closed to hold and lock the tray securely against one wall of the carton.

Other and further important objects and advantages of this invention will become apparent from the disclosures in the following specification and accompanying drawings.

Figure 1:
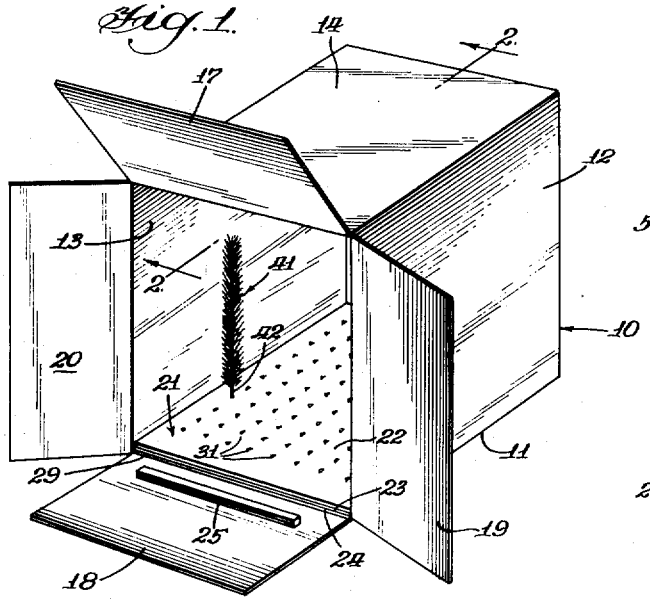
Figure 1 is a perspective view of the packaging carton of this invention.

The reference numeral 10 indicates generally a corrugated carton or the like having a bottom 11 with generally elongated sides 12 and 13 with a top 14. The ends 15 and 16 of the carton are openable and provide for access to the interior of the carton and enable articles to be put within the carton or removed therefrom as desired. The end 15 as shown in the fore part of Figure 1 has a vertically swingable top door 17 and a corresponding vertical swingable bottom door 18. Side swinging doors 19 and 20 swing inwardly from the elongated sides 12 and 13 and overlap or cover the vertically swingable doors 17 and 18. The side swinging doors 19 and 20 may be held in closed position by gummed tape or the like or any other suitable fastening means. The other end 16 of the carton 10 is constructed similar to the end 15 and the description thereof will not be repeated although where like parts are shown in the drawing or described in the specification they will be given the same numerals with an "a" suffix.

A tray 21 made of a corrugated laminate is designed for removable positioning within the carton 10 and is adapted to hold fragile articles in spaced apart position therein and to prevent intermingling or entanglement when the carton is closed. The tray consists of three layers of corrugated board sheets 22, 23, and 24 cemented or otherwise fixedly held together. The tray has substantial thickness by reason of the three corrugated layers thereof and is thus relatively rigid throughout its length and breadth.

A locking projection or board 25 is fastened by means of staples or the like 26 to the vertically swingable end door 18 on the end enclosure 15. A corresponding locking board 27 is fastened by staples or the like 28 to the vertically swingable bottom end door 18a on the other end enclosure 16. The locking boards 25 and 27 are spaced upwardly on the doors 18 and 18a from the respective door hinges 29 and 30 with the bottom 11 of the carton 10. The distance the locking boards 25 and 27 are located above the hinges 29 and 30 is substantially the same as the depth or height of the tray and thus when the doors 18 and 18a are swung upwardly to a closed position with the carton the locking boards 25 and 27 abut and lie over the top surface of the tray 21 thus holding the tray 21 against the bottom wall 11 of the carton whereby any articles held by the tray are held to the bottom of the carton. It should be evident that when the doors are closed the tray 21 is locked to the bottom of the carton. Correspondingly when the doors are open the tray 21 is free to be easily removed as desired.

Figure 4:
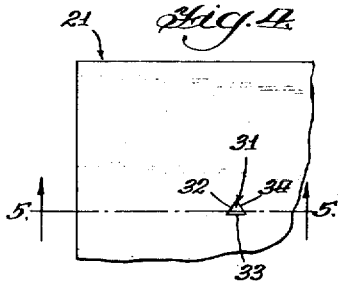
Figure 4 is an enlarged detail of a small portion of the tray as shown in Figure 3.

A plurality of holes 31 are provided in the tray 21 at regular spacings both along and across the top of the tray. These holes are triangular in shape having walls 32, 33, and 34 as clearly shown in the enlarged view thereof in Figure 4. The holes 31 are preferably formed by a triangular shaped tool or punch wherein there is formed within the hole three cooperative inner deformed walls of which 35 and 36 are shown in the top corrugated board 32, the walls 37 and 38 shown in the second or center corrugated sheet 23, and finally the walls 39 and 40 shown in the lowermost corrugated sheet 24. These cooperative deformed walls act as spring gripping members for holding elements inserted into the holes.

Figure 5:
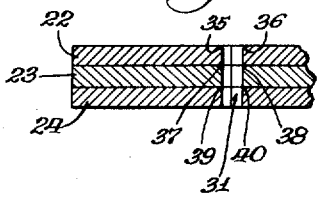
Figure 5 is a sectional view taken on the line 5—5 of Figure 4.
Figure 2:
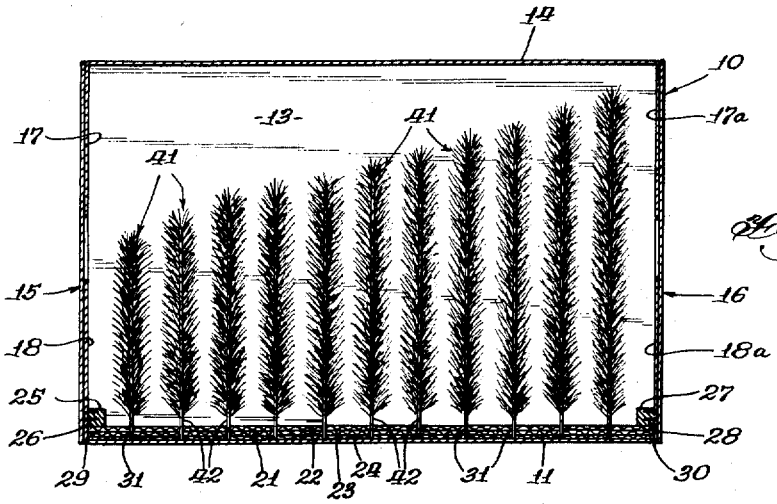
Figure 2 is a sectional view taken on the line 2—2 of Figure 1, but showing the carton closed.
Figure 3:
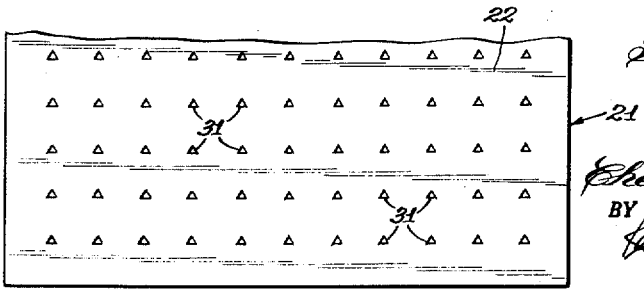
Figure 3 is a top plan view of the removable tray employed in the packaging carton of Figures 1 and 2.

Primarily the carton of this invention has been designed to hold removable branches of a fragile artificial Christmas tree wherein it is desired to maintain the branches separate from each other and wherein foil needles or needles of other material may be spaced apart from adjacent branches during storage and will be held in a substantially upright position without entanglement with each other even though the storing carton may be tilted or jostled around while handling. The fragile branches are shown at 41 and each of them has a round cylindrical rod 42 of generally elongated form wherein it is necessary to grip the round rod and hold it while in storage. This is accomplished by inserting the round rod 42 within the triangularly shaped punched holes 31 in the corrugated tray 21. As shown in Figure 5 the cooperative triangular hole walls of the several layers of corrugated boards forming the tray form separate spring gripping means for the round rod to thereby hold the rod in position in the tray against unwarranted removal. In other words all normal handling or movement of the cartons will not be sufficient to jar loose the rods from the holes and thus the rods with their foil needles thereon will remain in the tray within the carton until manually removed.

In the operation of the device of this invention the tray 21 is removed from the carton 10 through the end 15 or if desired through the end 16. In any event the tray is free of the carton and is easily accessible for placing fragile articles having rod ends within the receiving holes 31 therein. As previously described the triangularly shaped holes 31 within the tray are designed to firmly grip or clasp the round rods pushed therein until manually removed. When the tray is filled with the fragile, delicate articles such as the Christmas tree branches 41, the tray 21 is slid into the carton on the bottom 11 thereof and the ends 15 and 16 closed in such a manner that the locking projections or boards 25 and 27 on each end thereof lie over the tray 21 and thus prevent removal of the tray 21 from the bottom 11 when the ends are closed. Thus the fragile articles are locked in fixed position and spaced apart from each other when the carton is closed. Storing of fragile articles such as the Christmas tree branches is thus accomplished with a minimum of effort and quite economically. Further the cartons keep the fragile articles free from dust or dirt or the like and maintain the articles locked in spaced apart relation from each other.

The triangular shaped holes 31 in the removable tray or receiving board 21 with their spring extended wall gripping members shown at 35 and 36, 37 and 38, and 39 and 40 firmly hold a round rod inserted therein.

Numerous details of construction may be varied throughout a wide range without departing from the principles disclosed herein and I therefore do not propose limiting the patent granted hereon otherwise than as necessitated by the appended claims.

What is claimed is:

1. A package of artificial Christmas tree branches having substantially cylindrical bases or supporting ends, comprising a carton having a bottom, sides, top and openable ends, an article receiving tray similar in size and shape to the bottom of said carton and adapted to be slidably positioned within said carton on the bottom thereof, means associated with said openable ends for locking said tray in fixed position in said carton when the ends are closed, said article receiving tray comprising a corrugated board laminate, a plurality of holes punched in the surface of said laminate, and said holes frictionally receiving said cylindrical ends and supporting the branches in substantially vertical position within the carton.

2. A device as set forth in claim 1 in which said punched holes are triangular in shape.

*3. A package of artificial Christmas tree branches having substantially cylindrical bases or supporting ends, comprising a carton having a bottom, sides, top and openable ends, an article receiving tray similar in size and shape to the bottom of said carton and adapted to be slidably positioned within said carton on the bottom thereof, means associated with said openable ends for locking said tray in fixed position in said carton when the ends are closed, said article receiving tray comprising a corrugated board, a plurality of holes in said corrugated board, and said holes frictionally receiving said cylindrical ends and supporting the branches in substantially vertical position within said carton.*

References Cited in the file of this patent or the original patent

UNITED STATES PATENTS

| | | |
|---|---|---|
| 1,114,313 | Triebel | Oct. 20, 1914 |
| 1,919,562 | Kranzfelder | July 25, 1933 |
| 2,343,128 | Anderson | Feb. 29, 1944 |
| 2,739,705 | Pritchett et al. | Mar. 27, 1956 |
| 2,760,631 | Stearn | Aug. 28, 1956 |

FOREIGN PATENTS

| | | |
|---|---|---|
| 278,622 | Great Britain | Oct. 13, 1927 |
| 916,761 | France | Aug. 26, 1946 |